United States Patent
Juday et al.

(10) Patent No.: US 11,555,578 B2
(45) Date of Patent: Jan. 17, 2023

(54) SYSTEM FOR LUBRICATING CABLES OR THE LIKE

(71) Applicant: IDEAL Industries, Inc., Sycamore, IL (US)

(72) Inventors: Benjamin Juday, Sycamore, IL (US); Doug Sanford, Naperville, IL (US); Nathan Buckert, Sycamore, IL (US); Alan Zantout, Sycamore, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 330 days.

(21) Appl. No.: 16/742,027

(22) Filed: Jan. 14, 2020

(65) Prior Publication Data

US 2020/0224821 A1 Jul. 16, 2020

Related U.S. Application Data

(60) Provisional application No. 62/792,196, filed on Jan. 14, 2019.

(51) Int. Cl.
*F16N 29/02* (2006.01)
*F16N 7/00* (2006.01)
(Continued)

(52) U.S. Cl.
CPC ............ *F16N 29/02* (2013.01); *F16N 7/00* (2013.01); *F16N 7/38* (2013.01); *F16N 19/00* (2013.01);
(Continued)

(58) Field of Classification Search
CPC ........ F16N 29/02; F16N 7/00; F16N 2210/34; B65H 26/00; B05D 7/20
(Continued)

(56) References Cited

U.S. PATENT DOCUMENTS 2,261,531 A 11/1941 Thomas
2,654,442 A * 10/1953 Yakopatz ................ D07B 7/12
184/17

(Continued)

FOREIGN PATENT DOCUMENTS

AT 398241 B 10/1994
CN 105889726 A 8/2016
(Continued)

OTHER PUBLICATIONS

ISA/US, Int. Search Report and Written Opinion issued on PCT application No. US20/13448, dated May 19, 2020, 10 pages.
(Continued)

*Primary Examiner* — Michael R Mansen
*Assistant Examiner* — Mark K Buse
(74) *Attorney, Agent, or Firm* — Greenberg Traurig, LLP

(57) ABSTRACT

A lubricating system has a pump to force a viscous lubricant from a supply of lubricant to a lubricator at which the lubricant is to be dispensed onto a cable, wire, or the like that is being pulled through a conduit. A sensor, associated with a spool from which the cable is being dispensed, is be used to automatically control the amount of lubricant that is to be dispensed onto the cable. A second described system comprises a custom bucket or bucket insert which allow a cable to pass through the bucket whereupon lubricant will be automatically applied to the cable and the container includes a profiled base to ensure proper passage of the cable through the lubricant and ensure the maximum usage of any lubricant.

8 Claims, 2 Drawing Sheets

(51) Int. Cl.
*F16N 7/38* (2006.01)
*F16N 19/00* (2006.01)
*F16N 27/00* (2006.01)

(52) U.S. Cl.
CPC .......... *F16N 27/00* (2013.01); *F16N 2210/34* (2013.01); *F16N 2270/70* (2013.01)

(58) Field of Classification Search
USPC ....................................................... 184/15.2
See application file for complete search history.

(56) References Cited

U.S. PATENT DOCUMENTS

| | | | | |
|---|---|---|---|---|
| 2,858,555 | A | * | 11/1958 | Medovick ................. B05C 1/06 15/88 |
| 3,137,452 | A | * | 6/1964 | Winders .................. B21C 47/18 242/420.4 |
| 3,565,213 | A | * | 2/1971 | Heller ....................... H02G 1/08 184/15.2 |
| 3,578,763 | A | | 5/1971 | Platou |
| 3,783,972 | A | * | 1/1974 | Molstad .................... D07B 7/12 184/15.1 |
| 3,919,437 | A | * | 11/1975 | Brown .................. B29C 41/006 427/302 |
| 4,046,225 | A | | 9/1977 | Shenk |
| 4,169,174 | A | * | 9/1979 | Bixby ...................... B05D 7/20 72/73 |
| 4,410,147 | A | * | 10/1983 | Seibert ............... B65H 54/2875 242/478.2 |
| 4,422,529 | A | * | 12/1983 | Johansen ................. B66D 1/28 184/15.1 |
| 4,508,251 | A | * | 4/1985 | Harada .................. B65H 51/14 226/112 |
| 4,569,420 | A | | 2/1986 | Pickett et al. |
| 4,749,059 | A | | 6/1988 | Jonnes et al. |
| 5,368,644 | A | * | 11/1994 | Delgado ................. B05C 11/10 118/123 |
| 5,632,356 | A | * | 5/1997 | Sells ........................ H02G 1/08 184/15.1 |
| 6,676,998 | B2 | * | 1/2004 | Huang ................ B05B 13/0207 118/325 |
| 6,725,973 | B2 | * | 4/2004 | Coder ...................... H02G 1/08 184/15.1 |
| 6,848,541 | B2 | * | 2/2005 | Griffioen ................ H02G 1/086 184/15.2 |
| 7,097,155 | B2 | | 8/2006 | Jackson et al. |
| 7,143,866 | B2 | * | 12/2006 | Coder ................. B05B 13/0207 184/15.2 |
| 7,174,999 | B2 | * | 2/2007 | Coder ...................... H02G 1/08 184/15.1 |
| 7,992,685 | B2 | * | 8/2011 | Griffioen ................ H02G 1/086 184/15.1 |
| 9,486,931 | B2 | * | 11/2016 | Posarelli .............. B26D 7/1854 |
| 9,815,670 | B2 | * | 11/2017 | Bauder ..................... B66D 3/18 |
| 2005/0274576 | A1 | * | 12/2005 | Coder .................... H02G 1/086 184/15.2 |
| 2006/0102430 | A1 | * | 5/2006 | Griffioen ................ H02G 1/086 184/15.1 |
| 2006/0163547 | A1 | | 7/2006 | Jackson et al. |
| 2012/0085954 | A1 | * | 4/2012 | Shukhmin ........... F16K 31/0651 251/129.21 |
| 2016/0169448 | A1 | * | 6/2016 | Holman .................. F04B 19/22 184/6.4 |

FOREIGN PATENT DOCUMENTS

| | | |
|---|---|---|
| CN | 107906352 A | 4/2018 |
| EP | 0596853 A1 | 10/1993 |
| GB | 790551 A | 2/1958 |
| WO | 1988/03971 A1 | 11/1986 |
| WO | 1987/07534 A1 | 12/1987 |

OTHER PUBLICATIONS

CNIPA, office action issued on Chinese patent application No. 202080009099.5, dated Feb. 22, 2022, 6 pages.
CNIPA, translation of office action issued on Chinese patent application No. 202080009099.5, dated Feb. 22, 2022, 8 pages.
EPO, extended European search report issued on European patent application No. 20741686.8, dated Sep. 8, 2022, 8 pages.

* cited by examiner

SYSTEM FOR LUBRICATING CABLES OR THE LIKE

CROSS REFERENCE TO RELATED APPLICATION

This application is a non-provisional application claiming priority from U.S. Provisional Application Ser. No. 62/792,196, filed Jan. 14, 2019, entitled "System for Lubricating Cables or the Like" and incorporated herein by reference in its entirety.

FIELD OF THE DISCLOSURE

The present description relates generally to lubricating cables and more particularly to a system for lubricating cables or the like.

BACKGROUND OF RELATED ART

Systems and method for lubricating cables are generally known in the art.

U.S. Pat. No. 4,569,420 describes a lubricator by which lubrication is provided for the pulling of a cable through a conduit by using one or more lubricant nozzles on a nozzle head secured to the leading end of the cable so that, while the cable is pulled through the conduit, the lubricating material is sprayed outwardly onto the interior walls of the conduit ahead of the leading end of the cable being pulled.

U.S. Pat. No. 4,749,059 describes a lubricator including a split housing. Lubricant is introduced into the housing through a vertically oriented orifice, the cable advancing in a generally horizontal direction. A series of sponges apply lubricant to the cable in a metered fashion.

U.S. Pat. No. 5,632,356 describes an automatic cable lubricating device that includes a lubricant supply tank having an internal chamber and a regulating means for regulating the flow of a pressurized lubricant from within its internal chamber, a lubricant dispensing head having a cable feeding aperture therethrough and a plurality of lubricating ports, and a flexible lubricant supply hose having a first and second end. The dispensing head further includes an input port. The first end of the supply hose has a connecting means for connecting to the regulating means downstream of the supply tank. The second end of the supply hose has a connecting means for connecting to the dispensing head input port such that a lubricant under pressure stored within the internal chamber of the supply tank may be dispensed through the lubricating ports. The regulating means may be adjusted to control the output of lubricant from the lubricating ports. The dispensing head includes a conduit attachment means for attaching the dispensing head to a conduit such that in use the lubricating ports dispense the lubricant into the conduit so attached.

U.S. Pat. No. 6,725,973 describes an automatic wire lubricating device that includes first and second components each having a body section of semi-annular configuration defining a portion of a continuous cylindrical interior reservoir formed by the body sections when they are fastened together into an annular body defining a central opening. A pipe fitting is attached on an outer circumferential side of the body section of the first component in flow communication with the interior reservoir such that the pipe fitting can be coupled to a soap line coming from a pump. Dispensing holes circumferentially spaced apart and defined through the body sections provide flow communication from the interior reservoir to the central opening and coupler pins formed on opposite ends of the body sections of the first and second components fit together so as to make a tight seal of the interior reservoir when the first and second components are fastened together.

U.S. Pat. No. 7,143,866 describes a cable lubricating device having a pump to force a viscous lubricant from a supply to a lubricator at which the lubricant is to be dispensed onto a cable that is being pulled through the conduit. A battery powered motor drives the pump and a foot pedal is used to control the motor.

The disclosure within each of these patents is incorporated herein by reference in their entirety.

SUMMARY

Described herein are improved systems and methods for lubricating cables or the like.

A first described system has a pump to force a viscous lubricant from a supply of lubricant to a lubricator at which the lubricant is to be dispensed onto a cable, wire, or the like that is being pulled through a conduit. A sensor, associated with a spool from which the cable is being dispensed, is be used to automatically control the amount of lubricant that is to be dispensed onto the cable.

A second described system comprises of a custom bucket or bucket insert which allow a cable to pass through the bucket whereupon lubricant will be automatically applied to the cable.

A better appreciation of the objects, advantages, features, properties, and relationships of the subject systems will be obtained from the following detailed description and accompanying drawings which set forth illustrative examples which are indicative of the various ways in which the principles of the described systems may be employed.

BRIEF DESCRIPTION OF THE DRAWINGS

For a better understanding of the systems hereinafter described, reference may be had to the attached drawings in which.

DETAILED DESCRIPTION

The following description of example methods and apparatus is not intended to limit the scope of the description to the precise form or forms detailed herein. Instead the following description is intended to be illustrative so that others may follow its teachings.

The following describes systems and method for applying lubricant onto a cable, wire, line, or the like.

Figure 1:
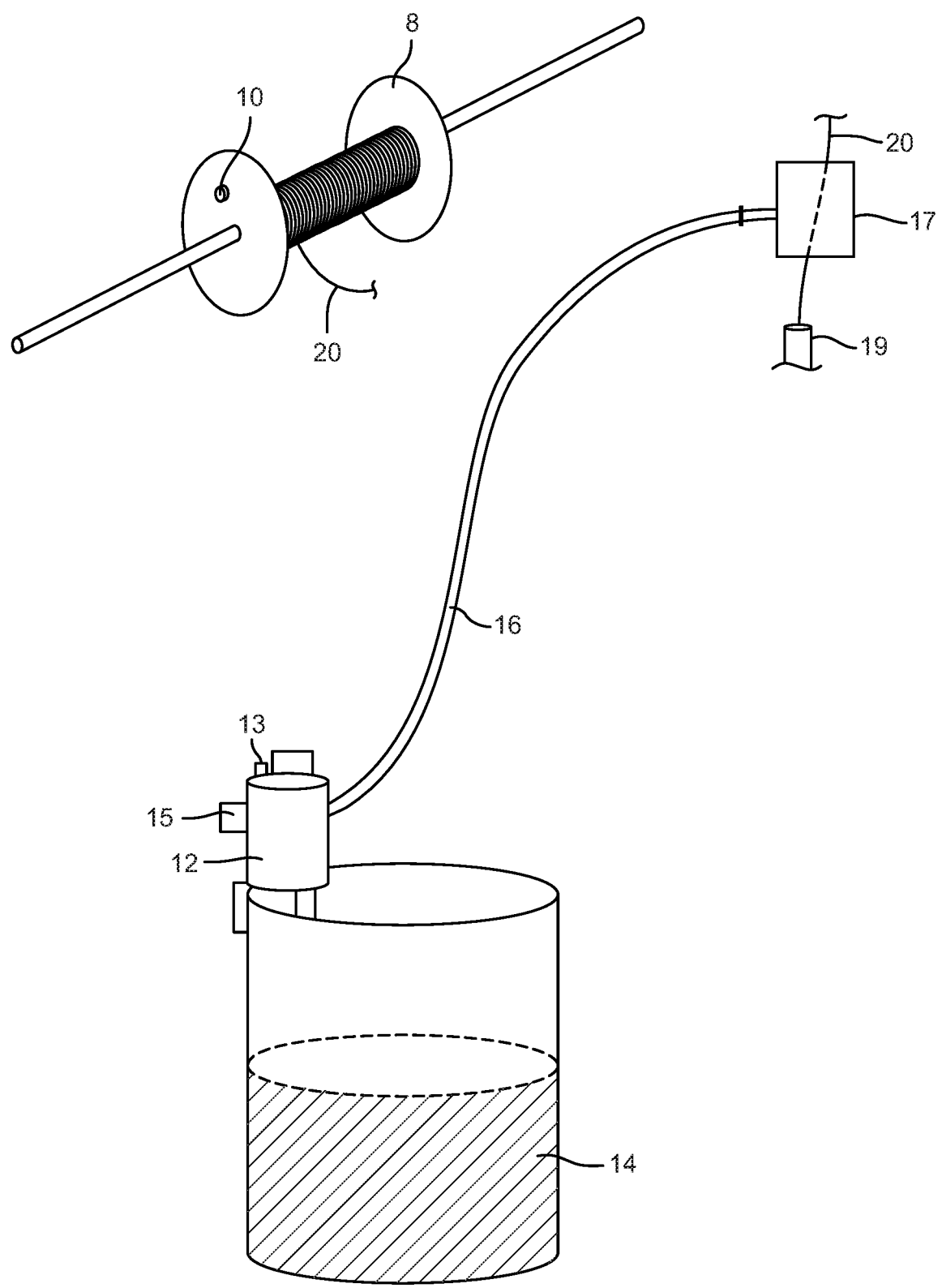
FIG. 1 illustrates a first example system for applying lubricant onto a cable.

Turning to FIG. 1, one or more sensors 10 are attached to or otherwise associated with a spool 8 that carries a cable 11 onto which lubricant is to be applied. The sensor(s) 10 can generate one or more signals that are used, in turn by, for example, a pump controller, to control the amount of lubricant that is to be applied onto the cable 11 via use of a controllable pump 12 that functions to force a viscous lubricant 14 from a supply of the lubricant 14, via a connection 16, such as for example a conduit, to a lubricator 17 at which the lubricant 14 is to be dispensed onto the cable 11 that is being moved therethrough. Once passing through the lubricator 17, the wire 11 may be feed into a further conduit 19, or may be otherwise suitably captured, such as for instance by being re-spooled onto a different spool, or returned to the spool 8.

Generally, the example sensor(s) 10 monitor how fast the cable is being drawn from the spool 8 and/or may monitor how much cable or a length of the cable that is being drawn from the spool and, accordingly, how fast the cable is being drawn through the lubricator and/or how much cable or a length of the cable that is being drawn through the lubricator. Any speed sensor(s) and/or distance sensor(s) provided for this purpose may be combined into one component or one sensor as desired. The sensor(s) utilized for this purpose may include accelerometers, optical sensors, encoders, and or the like.

The sensor(s) 10 are further preferably provided with a transmitter to communicate signals to a receiver 15 at the pump controller (which may be integrated into the pump 12 or which may be a separate component). The transmission of the signals from the sensor(s) 10 to the pump controller is preferably accomplished by means of a suitable wireless transmission protocol. As noted above, upon receipt of signal(s) from the sensor(s) 10, the pump controller can determine how much of the lubricant 14 the pump 12 is to provide to the lubricator 17 from the supply of the lubricant 14. To this end, the example pump 12 optionally includes a potentiometer that is coupled to the pump controller whereby the pump controller controls the potentiometer to adjust the flow-rate of the pump 12 to a desired amount given the signal(s) received from the sensor(s) 10.

It is also contemplated that the pump 12 may be provided with an override 13 to allow a user to momentarily switch off the system. In this manner, a user can perform any suitable action, including for instance, unwinding a cable 20 from the spool 8, braiding and/or splicing a new wire, etc., as desired without causing the system to provide lubricant 14 to the lubricator 17.

It is further contemplated that signal(s) generated by the sensor(s) 10 can be provided, in an alternative example, to another controller that may be used to control a system that functions to adjust a size of an orifice, such as for example within the conduit 16 or the lubricator 17, through which lubricant 14 is being provided to the lubricator 17 for the same purpose of controlling the amount of lubricant 14 that is to be provided onto the cable 20. The system that functions to adjust the size of the orifice may be a motor controlled clamping mechanism, motor controlled orifice, or the like without limitation. A manually controllable system that functions to adjust the size of the orifice may also be provided for use in connection with an automated pump to allow a user to fine tune the system as needed.

Figure 2A:
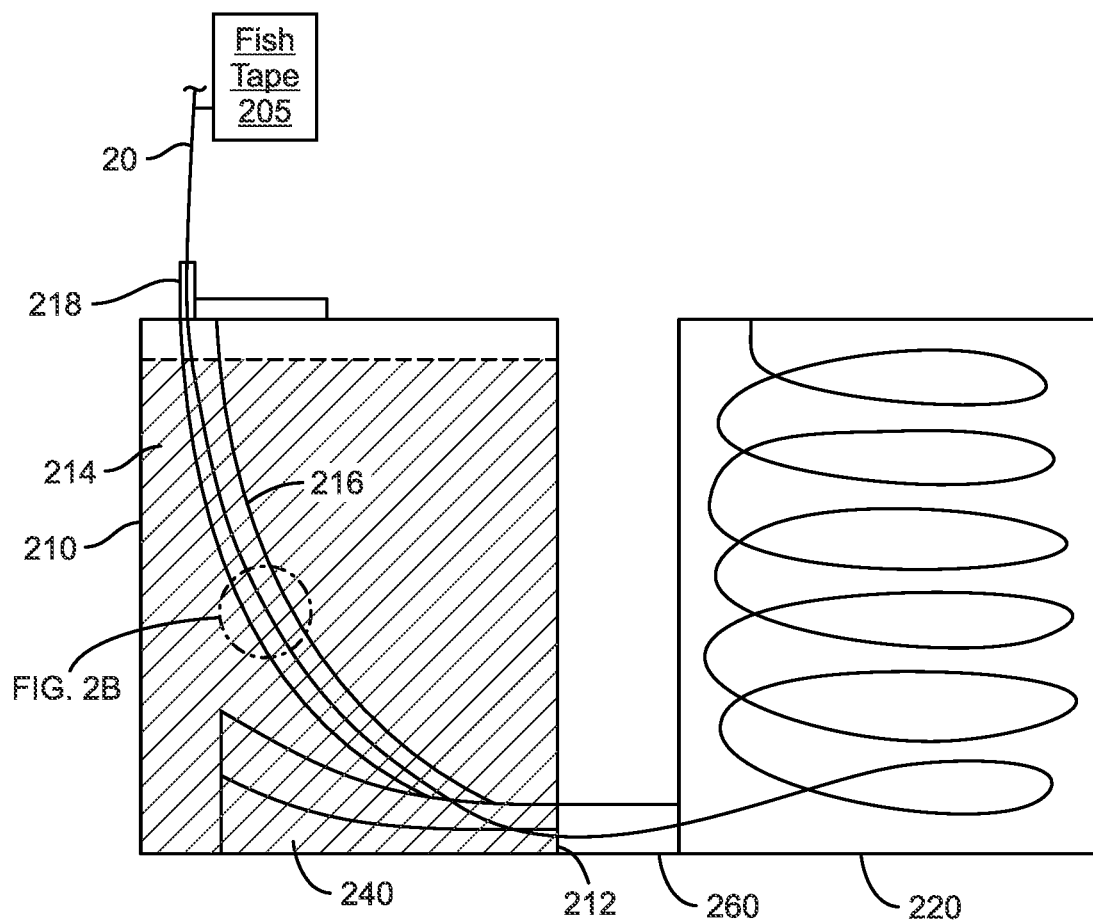
FIG. 2 illustrates a second example system for applying lubricant onto a cable.
Figure 2B:
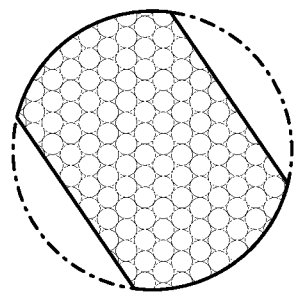

Turning to FIG. 2, a further system is illustrated that utilizes a custom bucket 210 or bucket insert which allows the cable 20 to pass through the bucket 210, automatically applying lubricant onto the cable 20. In the illustrated example, a "dipstick"-like item with a hook, such as for instance a known fish-tape provided by IDEAL Industries, will be used to initially pull the free end of the cable 20 through the bucket 210, more particularly, through an inlet aperture 212 provided to the bucket. A profiled base 240 is preferably provided within the bucket 210 and is used to bias a lubricant 214 into desired portions of the bucket 210. The cable 20 proceeds through the bucket 210, passing over the profiled base 240 and in this example, into an inner conduit 216 and comprising a foraminous surface. The cable 20 exits through an outlet aperture 218 located proximate the inlet aperture 212 or in another location. The foraminous surface allows any excess lubricant 214 to return to the bottom of the bucket 210. Preferably the size of the inlet aperture 212 and/or the outlet aperture 218 is adjustable to control application of the lubricant 214 to the cable 20.

As further shown in FIG. 2, an interconnection system 260 may be optionally provided to help connect two buckets 210, 220, one with lubricant 214 and another with cable storage therein, at the base. The example interconnection system 260 helps feed the cable 20 through the bucket 210 with lubricant 214, through an outlet aperture 218a, into the bucket 220, and through the inlet aperture 212a, while avoiding exposure and/or tangling etc. of the cable 20.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A system for lubricating comprising:
   a supply of viscous lubricant;
   a lubricator;
   a pump fluidly coupled to the supply of viscous lubricant and the lubricator to force the viscous lubricant from the supply of lubricant to the lubricator at which the lubricant is to be dispensed onto a cable that is being traversed through the lubricator;
   at least one sensor for generating one or more signals indicative of a rate of movement of the cable; and
   a pump controller configured to receive the one or more signals from the at least one sensor and to automatically control the amount of lubricant that is to be dispensed by the lubricator onto the cable via use of the pump according to the one or more signals.

2. The system of claim 1, wherein the cable is at least one of a cable, a wire rope, or a rope.

3. The system of claim 1, wherein the cable is traversed through the lubricator by a pull-feed device.

4. The system of claim 1, wherein the pump is fluidly coupled to the lubricator via a conduit.

5. The system of claim 1, wherein the at least one sensor for monitoring the withdrawal of the cable from the spool comprises a sensor mounted to a spool from which the cable is being withdrawn.

6. The system of claim 1, wherein the pump comprises a manual override control.

7. A system for lubricating comprising:
   a container comprising a viscous lubricant and defining an inlet aperture within the container to receive a cable from a coiling bucket operably coupled to the container therethrough and an outlet aperture for withdrawal of the cable from the container;
   a profiled base provided within the container, the profiled base having a profile selected to bias lubricant to the inlet aperture; and
   a conduit at least partially within the container to direct the cable from the inlet aperture through the viscous lubricant to the outlet aperture,
   wherein the conduit comprises a foraminous surface.

8. The system of claim 7, wherein the cable is at least one of a cable, a wire rope, or a rope.

* * * * *